United States Patent
Park

(10) Patent No.: US 9,956,889 B2
(45) Date of Patent: May 1, 2018

(54) APPARATUS AND METHOD FOR DISCHARGING BATTERY

(71) Applicant: HYUNDAI AUTRON CO., LTD., Seongnam-si (KR)

(72) Inventor: Jae-Seong Park, Suwon-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 98 days.

(21) Appl. No.: 14/962,222

(22) Filed: Dec. 8, 2015

(65) Prior Publication Data
US 2016/0159243 A1 Jun. 9, 2016

(30) Foreign Application Priority Data

Dec. 8, 2014 (KR) .................. 10-2014-0175280

(51) Int. Cl.
*H02J 7/00* (2006.01)
*B60L 1/00* (2006.01)
*B60L 11/18* (2006.01)

(52) U.S. Cl.
CPC ....... *B60L 11/1866* (2013.01); *B60L 11/1861* (2013.01); *Y02T 10/7005* (2013.01)

(58) Field of Classification Search
CPC .............. B60L 11/1866; B60L 11/1861; Y02T 10/7005; H02J 7/0031; H02J 7/0047; H02J 7/1438; H02J 7/0063; H02J 7/0065; H02J 2007/0067; H02J 2007/004; H02J 2007/0037; Y02E 60/12; G01R 31/3648;
(Continued)

(56) References Cited

U.S. PATENT DOCUMENTS

2013/0099746 A1* 4/2013 Nork .................. B60L 11/1866
320/118
2013/0106362 A1* 5/2013 Mackintosh ........ H01M 10/425
320/136
(Continued)

FOREIGN PATENT DOCUMENTS

CN 103066641 A 4/2013
CN 103683381 A 3/2014
(Continued)

*Primary Examiner* — Yalkew Fantu
*Assistant Examiner* — Mohammed J Sharief
(74) *Attorney, Agent, or Firm* — Baker McKenzie LLP; Hyunho Park

(57) ABSTRACT

The present invention relates to a battery discharging apparatus and a method thereof of a battery management system and an exemplary embodiment of the present invention provides a battery discharging apparatus, including: a battery module including a plurality of battery cells; a discharging element which is connected to the battery cells through switches to discharge a voltage of the battery cells; a detecting unit which detects an abnormal state of a vehicle; and a control unit which is connected to the battery module to monitor a charged/discharged status of the battery cells of the battery module and controls the switches to balance the battery cells, in which when the control unit receives a vehicle abnormal state signal from the detecting unit, the control unit controls the switches to be turned on/off at a predetermined duty ratio to discharge the battery cell.

8 Claims, 7 Drawing Sheets

(58) Field of Classification Search
CPC ....... H01M 10/48; H01M 10/44; B60R 16/03;
B60R 16/0315; B60R 21/017
USPC .................. 320/136, 134, 135; 307/10.1
See application file for complete search history.

(56) References Cited

U.S. PATENT DOCUMENTS

| | | | | |
|---|---|---|---|---|
| 2014/0028263 A1* | 1/2014 | Jo | ..................... | H02J 7/0016 320/128 |
| 2014/0070772 A1* | 3/2014 | Andres | ................ | H01M 2/347 320/136 |
| 2014/0292345 A1* | 10/2014 | Matumoto | ......... | G01R 31/3658 324/434 |

FOREIGN PATENT DOCUMENTS

| JP | 2013-074707 A | 4/2013 |
|---|---|---|
| KR | 10-2012-0059247 A | 6/2012 |

* cited by examiner

| TIME | 39 OHM ||
| --- | --- | --- |
| | Top | Bottom |
| START | 75 | 75 |
| 30 SECONDS | 103 | 105 |
| ONE MINUTE | 120 | 123 |
| ONE MINUTE 30 SECONDS | 132 | 135 |
| TWO MINUTES | 141 | 142 |
| THREE MINUTES | 152 | 155 |
| FOUR MINUTES | 159 | 164 |
| FIVE MINUTES | 165 | 170 |
| NINE MINUTES FIVE SECONDS | 180 | 180 |
| TEN MINUTES | | |
| FIFTEEN MINUTES | | |
| TWENTY MINUTES | | |
| THIRTY MINUTES | | |

FIG.5

APPARATUS AND METHOD FOR DISCHARGING BATTERY

CROSS-REFERENCE TO RELATED APPLICATIONS

This application claims priority to and the benefit of Korean Patent Application No. 10-2014-0175280 filed in the Korean Intellectual Property Office on Dec. 8, 2014, the entire contents of which are incorporated herein by reference.

TECHNICAL FIELD

This specification relates to a battery management system which is used for an apparatus using electric energy, and more particularly, to a battery discharging apparatus and a method thereof in a high voltage battery management system used in a hybrid vehicle and an electric vehicle.

BACKGROUND ART

Recently, various apparatuses which use high voltage batteries, such as industrial equipment, home appliances, and vehicles have become more common. Specifically, the high voltage batteries are more actively used in a vehicle technology field.

A vehicle which uses an internal combustion engine using fossil fuel such as gasoline or heavy oil as a major fuel seriously causes environmental contamination such as air pollution. Therefore, recently, people exert great efforts to develop an electric vehicle or a hybrid vehicle, in order to reduce environmental contamination.

The electric vehicle (EV) refers to a vehicle which uses an electric battery and an electric motor without using an oil fuel and an engine. That is, a motor rotates by electricity accumulated in a battery to drive the vehicle. The electric vehicle was developed earlier than a gasoline vehicle. However, the electric vehicle is not commercially used due to problems such as a heavy weight of a battery, a limitation of a battery capacity, and a time to charge the battery. As energy and environmental problems become serious, studies to commercialize the electric vehicle fully start since the 1990s.

In the meantime, recently, as a battery technology rapidly improves, an electric vehicle and a hybrid vehicle (HEV) which adaptively uses a fossil fuel and electric energy are commercially used. Since the HEV uses both gasoline and electricity as a power source, the HEV is positively evaluated in view of improvement of power efficiency and reduction of exhaust gas and is expected to play an intermediate role in evolution to a perfect electric vehicle.

In the HEV and the EV which use the electric energy, a battery in which a plurality of chargeable secondary cells is formed to be one pack is used as a major power source so that no exhaust gas is generated and a noise level is very low.

As described above, in the vehicle which uses the electric energy, the performance of the battery directly affects a performance of the vehicle. Therefore, a battery management system (BMS) which not only measures a voltage of each battery cell, and a voltage and a current of the entire battery to efficiently manage charge or discharge of the battery cell but also monitors a status of a cell sensing IC which senses each battery cell to stably control the cell is acutely required.

FIG. 1 is a block diagram illustrating a battery management system according to a related art.

Referring to FIG. 1, a vehicle battery management system 100 includes a battery pack 10 including a plurality of battery modules, a vehicle electrical system 20, and a battery control device 30.

The battery pack 10 includes a plurality of battery modules 11 and 12. The battery modules 11 and 12 include a plurality of battery cells. The battery stack 10 supplies a charged high voltage DC power to the vehicle electrical system 20 such as a motor.

The battery control device 30 includes a plurality of MCUs 31 and 32 and a BCU 33 which controls the MCUs. The battery control device 30 is connected to the battery pack 10 to monitor a charged/discharged status of the battery pack 10 and controls the charging/discharging operation of the battery pack 10.

As described above, a voltage deviation between battery cells caused by a structural difference is inevitably generated in the battery management system to which the plurality of battery cells is coupled. The voltage deviation hinders uniformity of the voltage of the battery and in turn deteriorates the battery so that a lifespan of the battery is shortened.

Accordingly, a battery cell balancing operation which uniformly maintains a voltage of each cell at the time of operating a system using a battery power or charging and discharging the battery cell is a very important factor of the battery management system.

In the meantime, when collision of the vehicle which uses a high voltage battery or vehicle damage occurs, a leakage current may be generated from the high voltage battery to a chassis of the vehicle. The leakage current of the battery may cause a negligent accident such as fire in the vehicle or electric shock to a driver.

US Patent Unexamined Publication No. 2014-0070772 discloses a technology which detects a vehicle crash to operate a battery cell balancing circuit, and discharge a battery pack.

However, according to the related art, all cells are simultaneously balanced, so that excessive heat which is 100° C. or higher is generated in the balancing circuit and risk of fire or explosion may be raised as problems.

SUMMARY OF THE INVENTION

The present invention has been made in an effort to provide a battery discharging apparatus and a method thereof which prevent a battery cell balancing circuit from being overheated at the time of discharging a battery in a battery management system.

An exemplary embodiment of the present invention provides a battery discharging apparatus, including: a battery module including a plurality of battery cells; a discharging element which is connected to the battery cells through switches to discharge a voltage of the battery cells; a detecting unit which detects an abnormal state of a vehicle; and a control unit which is connected to the battery module to monitor a charged/discharged status of the battery cells of the battery module and controls the switches to balance the battery cells, in which when the control unit receives a vehicle abnormal state signal from the detecting unit, the control unit controls the switches to be turned on/off at a predetermined duty ratio to discharge the battery cell.

The control unit may control the switch at a duty ratio in which an on:off ratio is 3:7.

A plurality of battery modules may be provided and the control unit may independently control the battery modules at the predetermined duty ratio, or simultaneously control adjacent battery modules at the predetermined duty ratio to discharge the battery cells, or simultaneously control the entire battery modules at the predetermined duty ratio to simultaneously discharge the battery cells.

The control unit may subsequently perform cell sensing, cell diagnosing, and cell balancing control including turning on/off the switch during a predetermined interval, and the on and off interval of the switch may have a duty ratio of 3:7.

Another exemplary embodiment of the present invention provides a battery cell discharging method of a vehicle battery management system including battery modules configured by a plurality of battery cells, the method including: detecting, by a sensor, a car crash or damage to generate a vehicle abnormal state signal; receiving, by a control unit, the vehicle abnormal state signal; and controlling a switch to be turned on/off at a predetermined duty ratio to discharge the battery cell, in which an on:off ratio of the duty ratio of the switch may be set to be 3:7.

According to the exemplary embodiment of the present invention, the battery cell balancing circuit is prevented from being overheated at the time of discharging a battery, so that risk of fire or explosion of a high voltage battery may be prevented.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 is experimental data obtained by measuring a temperature rise of a battery cell when a duty ratio control is not applied.

Figure 1:
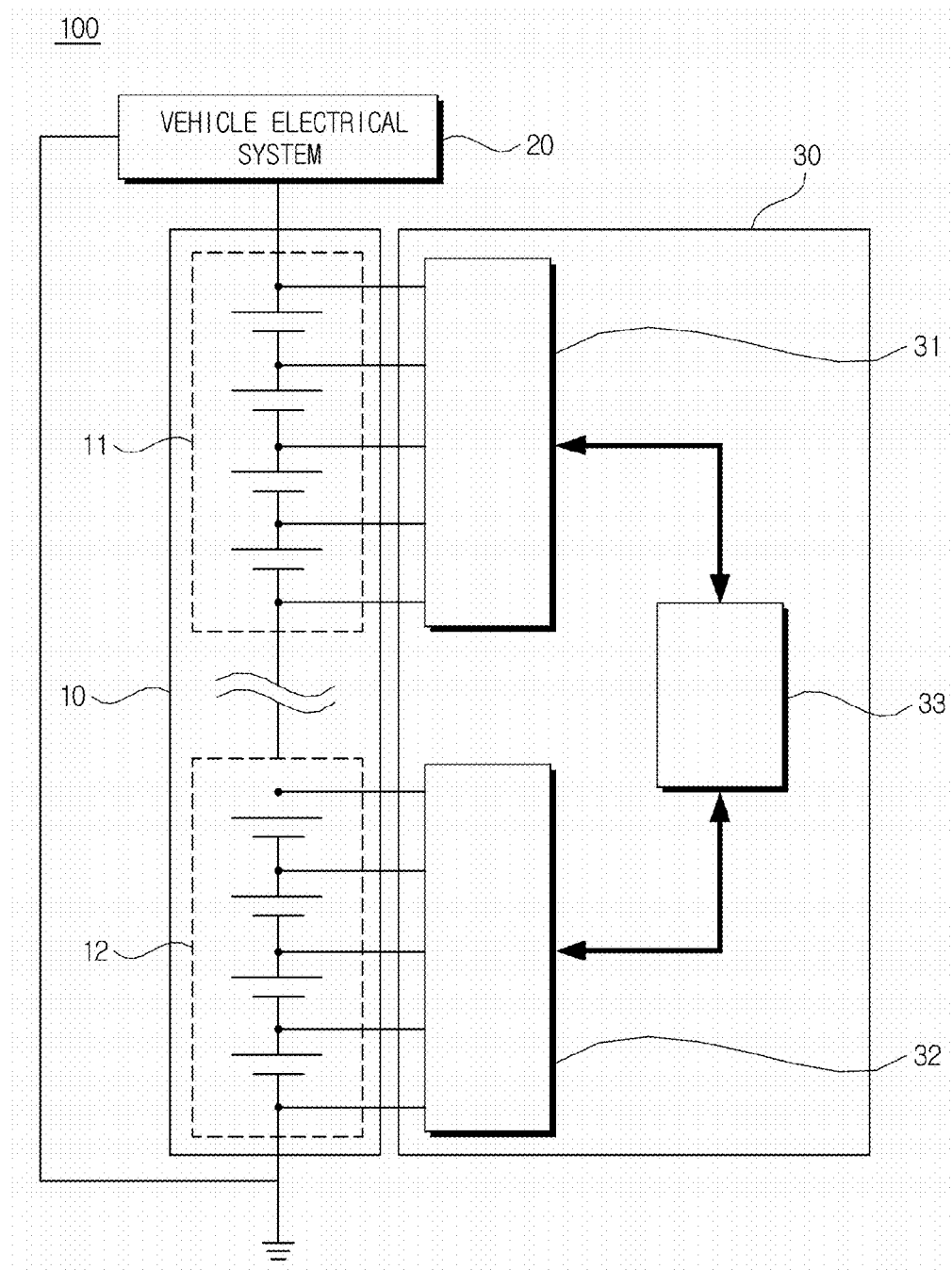
FIG. 1 is a block diagram illustrating a battery management system according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter, exemplary embodiments of the present invention will be described in detail with reference to the accompanying drawings.

When the exemplary embodiment is described, a technology which is well known in the technical field of the present invention and is not directly related with the present invention will not be described. The reason is that unnecessary description is omitted to clearly transmit the gist of the present invention without obscuring the gist.

By the same reason, in the accompanying drawings, some parts are exaggerated, omitted, or schematically illustrated. Further, an actual size is not fully reflected to the size of each component. In the drawings, like reference numerals denote like components.

Hereinafter, a battery discharging apparatus and a method thereof of a battery management system according to an exemplary embodiment of the present invention will be described with reference to the accompanying drawings.

Figure 2:
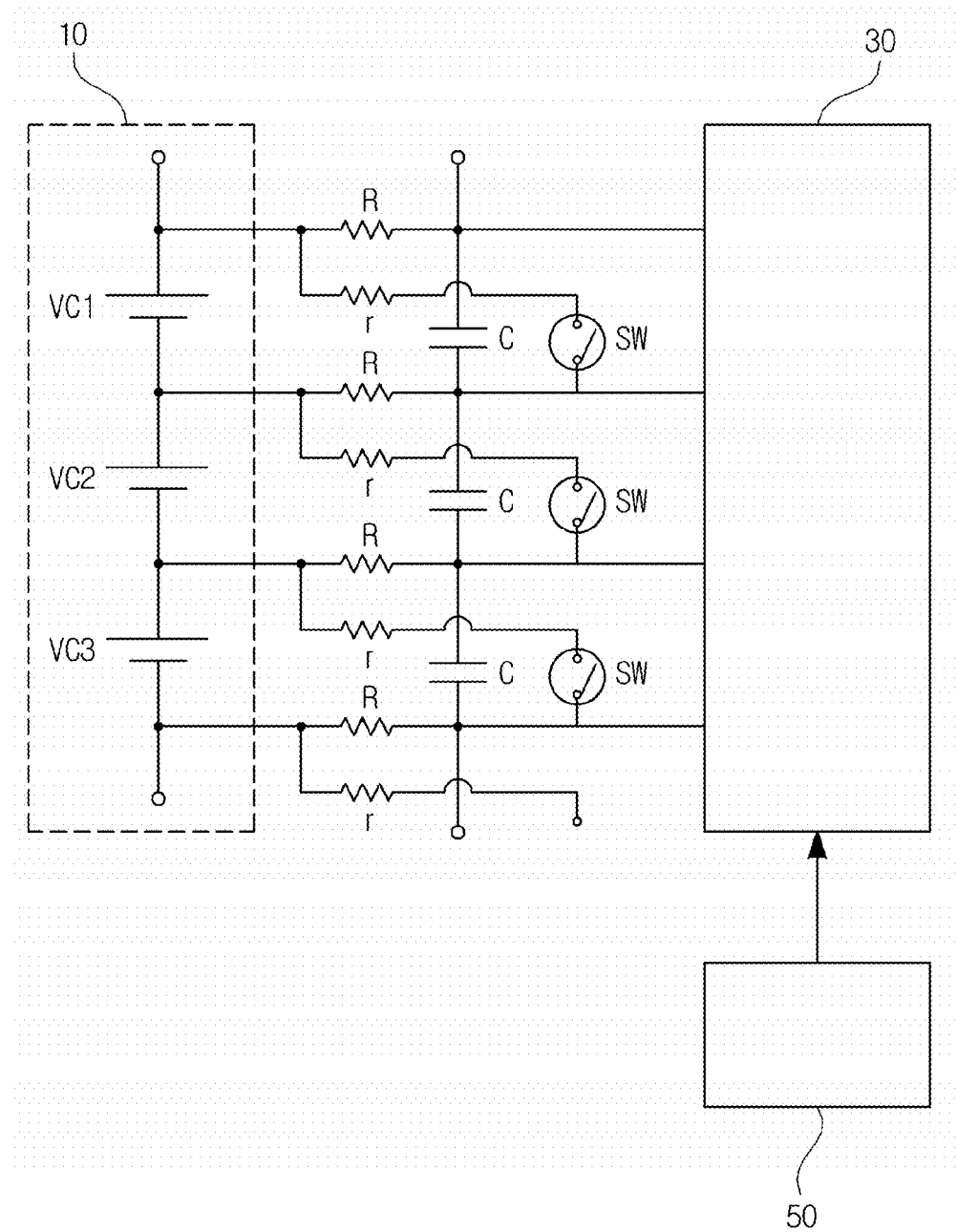
FIG. 2 is a block diagram of a battery management system according to an exemplary embodiment of the present invention.

FIG. 2 is a block diagram of a battery management system according to an exemplary embodiment of the present invention.

A vehicle battery management system includes a battery pack 10 in which a plurality of battery cells is serially connected and a battery control unit 30.

The battery pack 10 includes a plurality of battery modules 11 which is connected in series, the battery module 11 includes a plurality of battery cells VC1, VC2, and VC3, and the battery modules 11 may be connected in series or parallel, in the battery pack. Even though only a battery pack 10 is illustrated in FIG. 2 for convenience of description, a plurality of battery modules 11 which is connected in series or parallel may be provided in the battery pack 10. Further, even though just three battery cells VC1, VC2, and VC3 are illustrated in the drawing for convenience of description, in the present invention, three or more battery cells may be provided.

A high voltage DC power which is charged in the battery cells VC1, VC2, and VC3 is supplied to a vehicle electrical system such as a motor.

The control unit 30 is connected to the battery cells VC1, VC2, and VC3 to monitor a charged/discharged status of the battery cells VC1, VC2, and VC3 and controls a charging/discharging operation of the battery cells VC1, VC2, and VC3. That is, the battery cells VC1, VC2, and VC3 are connected to the control unit 30 so that the control unit 30 monitors the charged/discharged status of the cells and charges/discharges the cells.

In this case, when wires which connect between the cells are cut to be open or an internal resistance is increased, a charging current which needs to flow in the battery pack 10 flows in the control unit 30 such that the control unit 30 may be damaged by a fire. In order to prevent damage by a fire, a protective resistor R is configured between each cell and the control unit 30 as illustrated in the drawing. Further, an RC circuit which serves as a filter to remove a noise of a signal which is input from the battery cells VC1, VC2, and VC3 to the control unit 30 is configured between the battery cells VC1, VC2, and VC3 and the control unit 30.

A discharging resistor r and a switch SW which maintains a balance of a charging voltage between cells are connected in parallel in every cell, between the battery cells VC1, VC2, and VC3 and the control unit 30. In this case, the discharging resistor r serves as a discharging element. Therefore, a discharging operation for cell balancing may be allowed for every cell, in accordance with a control signal of the control unit 30. Further, the control unit 30 is connected to a detecting unit 50 which detects an abnormal state of a vehicle to receive an abnormal state detecting signal such as vehicle crash from the detecting unit 50.

According to an exemplary embodiment of the present invention, the detecting unit 50 may be an airbag control unit (ACU) or an airbag operating sensor. Therefore, the detecting unit 50 detects a signal which actuates an airbag due to the vehicle crash to detect the crash of the vehicle.

When the control unit 30 receives the abnormal state detecting signal such as vehicle crash, from the detecting unit 50, the control unit 30 controls a duty ratio of the switch SW to discharge the battery cells VC1, VC2, and VC3.

Figure 3:
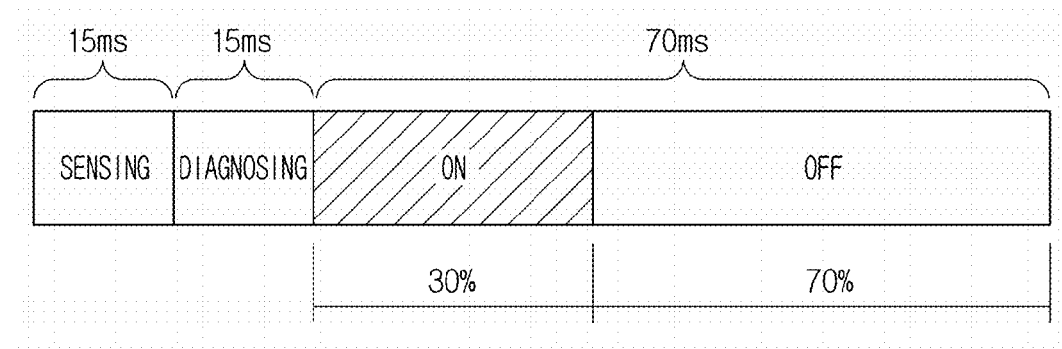
FIG. 3 is a reference view explaining a duty ratio control according to an exemplary embodiment of the present invention.

FIG. 3 is a reference view explaining a duty ratio control according to an exemplary embodiment of the present invention.

Referring to FIG. 3, the control unit 30 repeats a BMS measurement cycle of approximately 100 ms and sequentially and continuously performs cell sensing, cell diagnosing, and cell balancing operations during the BMS measurement cycle of 100 ms.

Generally, the cell sensing operation is performed for approximately 15 ms, and continuously, the cell diagnosing operation is performed for approximately 15 ms, and the cell balancing operation is performed for the remaining 70 ms.

During the cell balancing period, generally, a balancing switch SW is turned on to discharge a cell voltage. However, according to the exemplary embodiment of the present invention, during the entire cell balancing period, the switch SW is not maintained to be continuously turned on, but the switch SW is turned on during 30% of the cell balancing period, and then the switch SW is turned off during the remaining 70% of the cell balancing period. When a duty ratio control of 3:7 is applied during the measurement cycle of 100 ms, the switch-on is maintained for approximately 21 ms and the switch is maintained to be turned off for 49 ms.

When the duty ratio on/off control as described above is performed, overheating caused when the plurality of cells is simultaneously discharged may be prevented.

The duty ratio control for discharging a battery cell as described above may be applied to one unit cell, but desirably may be applied to a battery module.

In this case, the control unit 30 may apply the duty ratio control for discharging a battery cell independently to the plurality of battery modules or apply the duty ratio control to every group of adjacent battery modules. Further, the duty ratio control may be simultaneously applied to entire battery modules.

Figure 4:
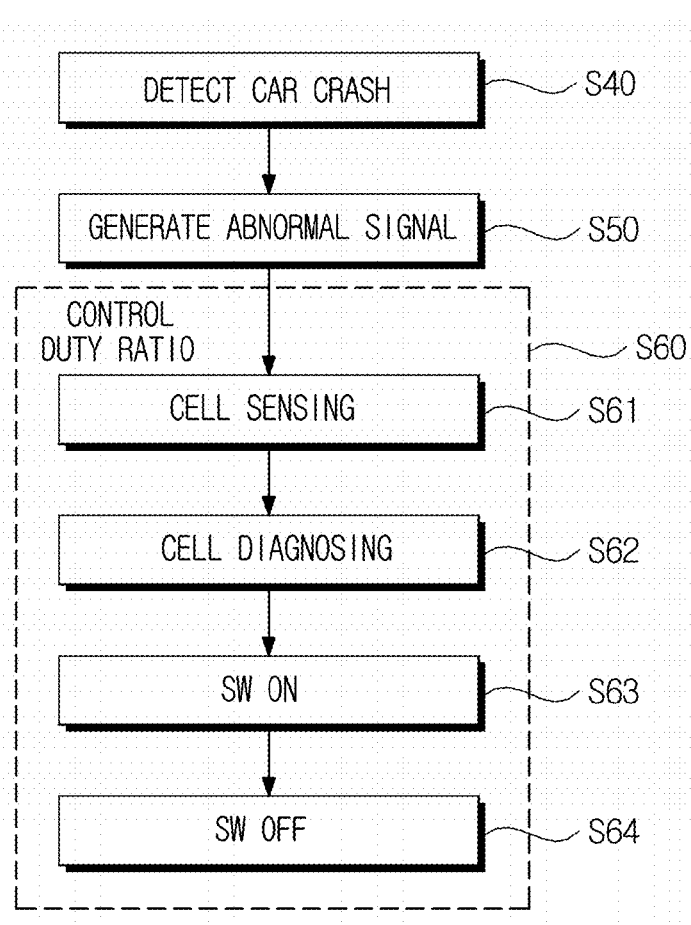
FIG. 4 is a flowchart sequentially illustrating a battery discharging method according to an exemplary embodiment of the present invention.

FIG. 4 is a flowchart sequentially illustrating a battery discharging method according to an exemplary embodiment of the present invention.

When the detecting unit 50 detects vehicle crash or car damage in step S40, the detecting unit 50 generates a vehicle abnormal signal in step S50.

When the control unit 30 receives the vehicle abnormal signal from the detecting unit 50, the control unit 30 performs duty ratio control for discharging the battery cell in step S60.

As described above, referring to FIG. 3, according to the duty ratio control, the cell discharging switch is controlled to be turned on/off at a predetermined duty ratio to discharge the cell while preventing a temperature of the battery cell from being excessively increased.

That is, the cell sensing is performed during a predetermined period in step S61. Next, continuously, the cell diagnosing operation is performed in step S62. Thereafter, the switch is turned on at approximately 30% of the entire balancing period to discharge the cell voltage in step S63 and the switch is turned off during the remaining interval to stop discharging the cell voltage in step S64.

FIG. 5 is experimental data obtained by measuring a temperature rise of a battery cell when a duty ratio control is not applied.

Referring to FIG. 5, a temperature change of a balancing resistor is measured for approximately thirty minutes when the switch is maintained to be 100% turned on (closed circuit) during the cell balancing period at the time of controlling the cell balancing for discharging the cell voltage. In this case, a used balancing resistance is 39 ohm and the experiment is performed in a temperature and humidity chamber (temperature is 75° and humidity is 50%).

From an experimental result value when the switch is 100% turned on during the balancing period, it is confirmed that a temperature of the balancing resistor is rapidly increased to 180° C. in 9 minutes and 5 seconds after starting the experiment, which causes danger of fire. The experiment is stopped due to the sharp temperature rise as described above and thus, referring to an experimental result of FIG. 5, it may be understood that when the cell is discharged while the duty ratio control is not applied, danger of fire in the BMS system may occur due to the sharp temperature rise.

FIGS. 6 to 11 are experimental data obtained by measuring a temperature rise of a battery cell and a battery module when a duty ratio control of the exemplary embodiment of the present invention is applied. In FIGS. 6 to 11, when a duty ratio (30% duty) of 3:7 is periodically applied, a temperature is measured.

Figure 6:
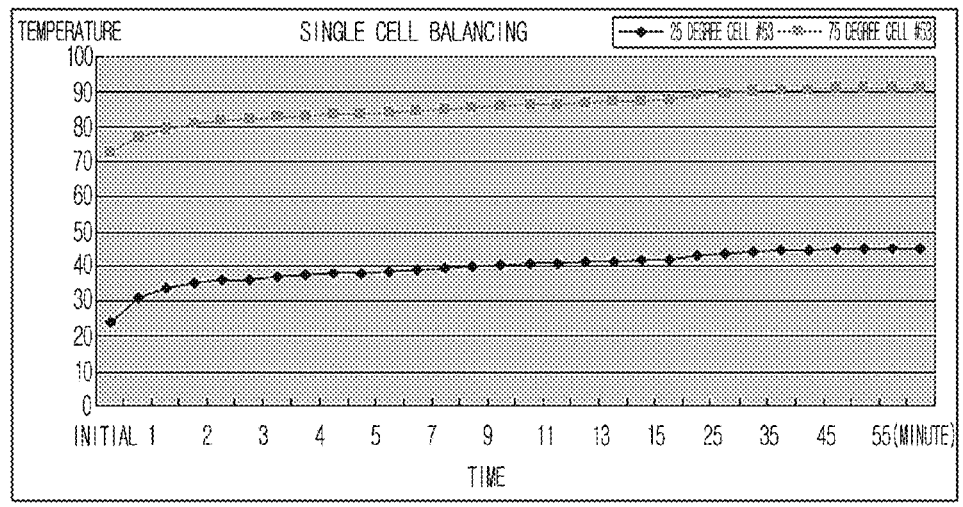
FIGS. 6 to 11 are experimental data obtained by measuring a temperature rise of a battery cell and a battery module when a duty ratio control of the exemplary embodiment of the present invention is applied.

FIG. 6 is a graph illustrating an experimental result when 30% duty ratio balancing is applied to a signal battery cell and the result is measured at a room temperature (25° C.) and in a temperature and humidity chamber (75° C. and 50% of humidity).

It is understood that at the room temperature, a temperature of the battery cell is continuously increased from approximately 25° C. at first and then the temperature of the battery cell is saturated at approximately 40° C. and then is not increased anymore. Further, it is understood that when the experiment is performed in the temperature and humidity chamber, the temperature of the battery cell is saturated at approximately 91.2° C. and the temperature is not increased anymore.

Figure 7:
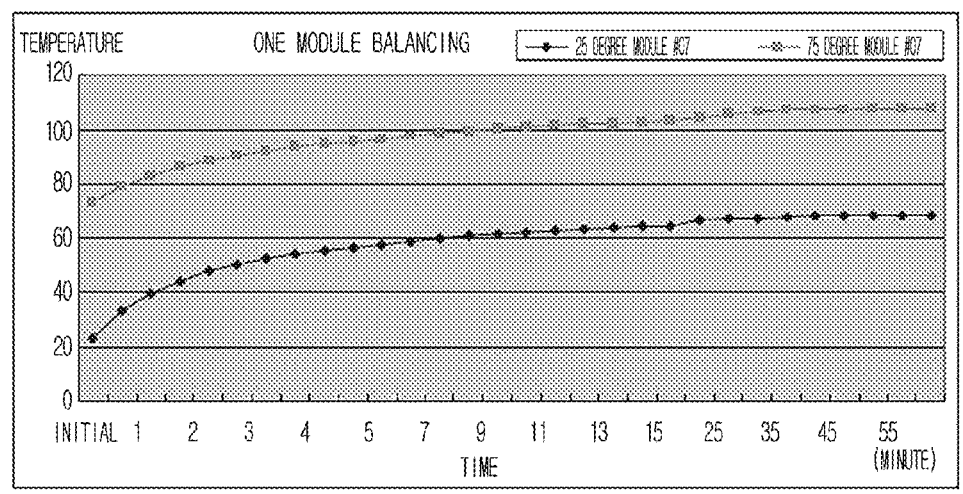

FIG. 7 is a graph illustrating an experimental result when 30% duty ratio balancing is applied to one battery module and the result is measured at a room temperature (25° C.) and in a temperature and humidity chamber (75° C. and 50% of humidity).

It is understood that at the room temperature, a temperature of the battery module is continuously increased from approximately 25° C. at first and then the temperature of the battery cell is saturated at approximately 65° C. and then is not increased anymore. Further, it is understood that when the experiment is performed in the temperature and humidity chamber, the temperature of the battery cell is saturated at approximately 110° C. and the temperature is not increased anymore.

Figure 8:
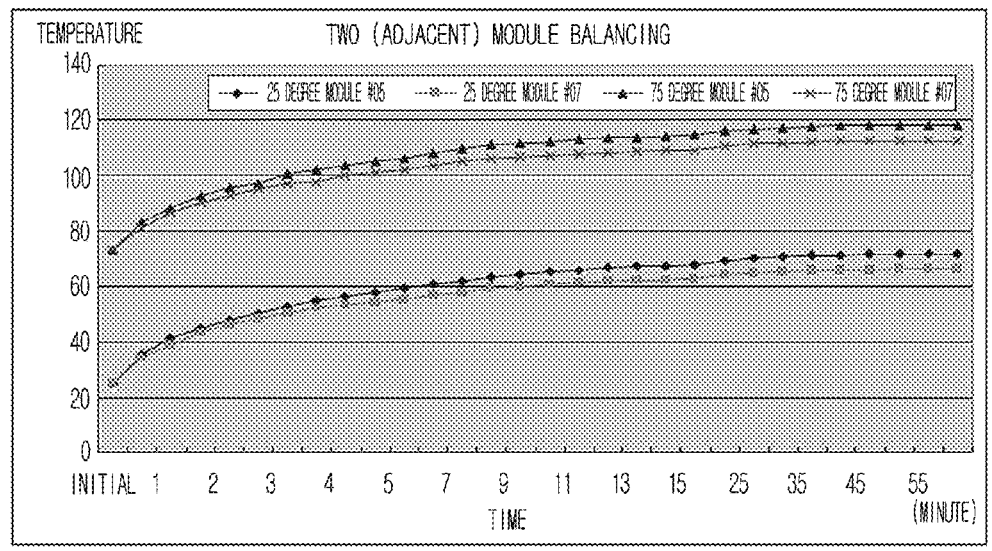

FIG. 8 is a graph illustrating an experimental result when 30% duty ratio balancing is applied to two adjacent battery modules (module #05 and module #07) and the result is measured at a room temperature (25° C.) and in a temperature and humidity chamber (75° C. and 50% of humidity).

It is understood that at the room temperature, temperatures of the battery modules are continuously increased from approximately 25° C. at first and then the temperatures of the two battery modules are saturated at approximately 65° C. and 71° C. and then are not increased anymore. Further, it is understood that when the experiment is performed in the temperature and humidity chamber, the temperatures of the two battery modules are saturated at approximately 112° C. and 117° C. and the temperatures are not increased anymore.

Figure 9:
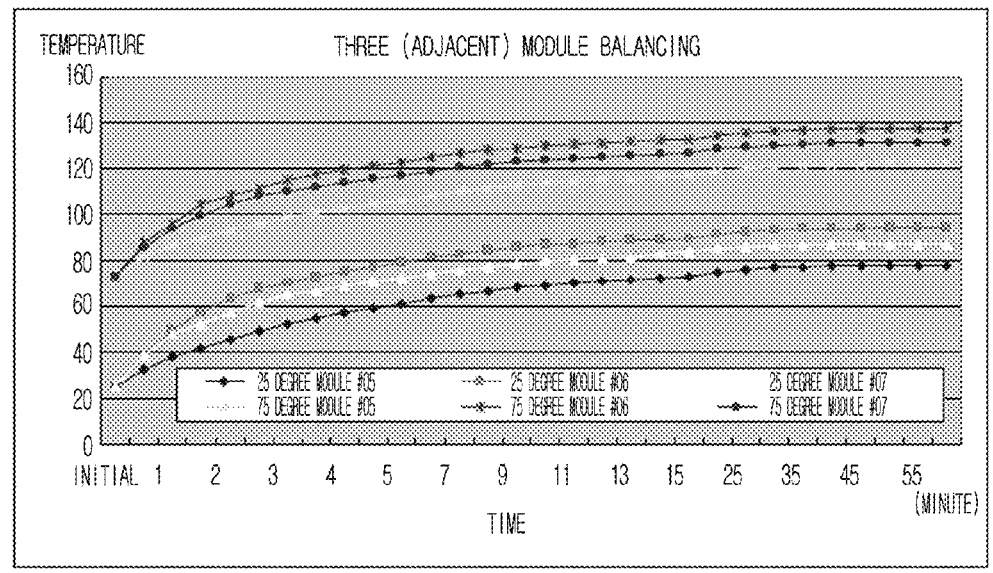

FIG. 9 is a graph illustrating an experimental result when 30% duty ratio balancing is applied to three adjacent battery modules (module #05, module #06, and module #07) and the result is measured at a room temperature (25° C.) and in a temperature and humidity chamber (75° C. and 50% of humidity).

It is understood that at the room temperature, temperatures of the battery modules are continuously increased from approximately 25° C. at first and then the temperatures of the three battery modules are saturated at approximately 77° C., 94° C., and 86° C. and then are not increased anymore. Further, when the experiment is performed in the temperature and humidity chamber, the temperatures of the three battery modules are saturated at approximately 122° C., 136° C., and 131° C. and the temperatures are not increased anymore.

Figure 10:
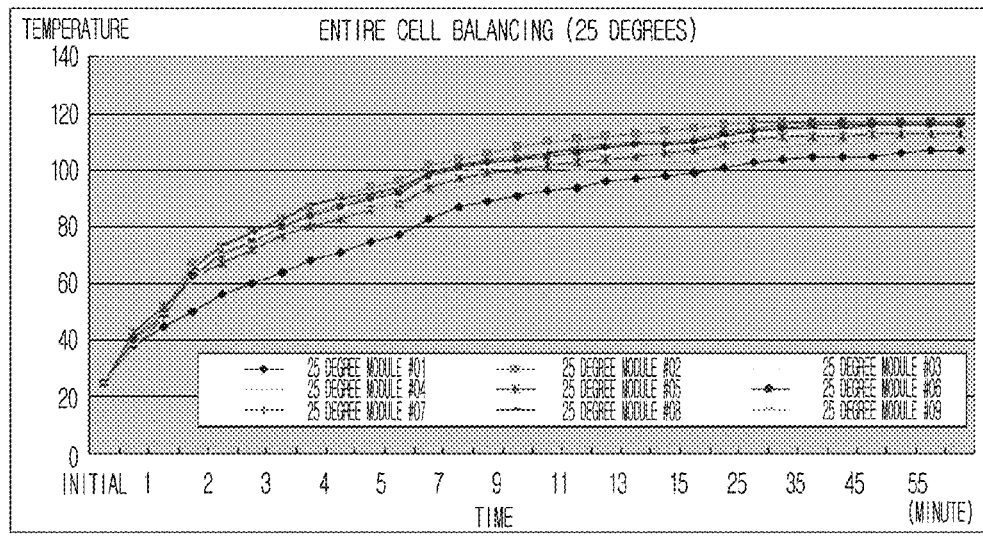
Figure 11:
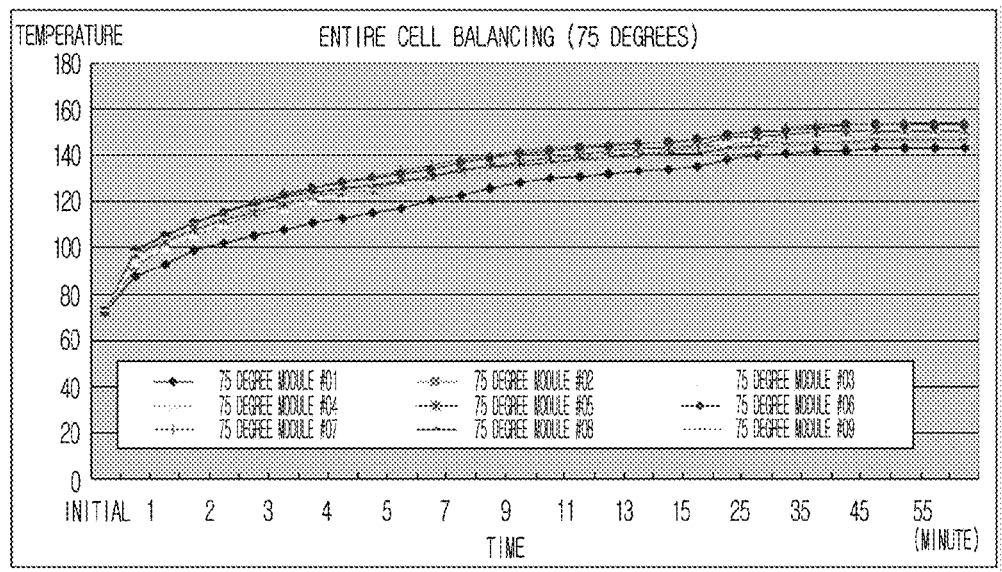

FIG. 10 is a graph illustrating an experimental result when 30% duty ratio balancing is applied to a total of eight battery modules (module #01 to module #08) and the result is measured under room temperature (25° C.).

As seen from the graphs, it is understood that when the discharging is performed on the entire cells through 30% duty ratio control, in a battery module #02 having the highest temperature, the temperature is saturated at 117° C. which is the maximum so that the temperature is not increased anymore.

FIG. 10 is a graph illustrating an experimental result when 30% duty ratio balancing is applied to a total of eight battery modules (module #01 to module #08) and the result is measured in a temperature and humidity chamber (75° C. and humidity of 50%).

As seen from the graphs also, it is understood that when the discharging is performed on the entire cells through 30% duty ratio control, in a battery module #07 having the highest temperature, the temperature is saturated at most 153° C. so that the temperature is not increased anymore.

As seen from the experimental result described above, when the battery cell is discharged by applying the on/off duty ratio control according to the present invention, the rapid temperature rise of the battery cell is minimized, thereby preventing the battery cell balancing circuit from being overheated or fired.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A battery discharging apparatus, comprising:
a battery module including a plurality of battery cells;
discharging elements which are connected to the plurality of battery cells, respectively through switches to discharge a voltage of the plurality of battery cells;
a detecting unit which detects an abnormal state of a vehicle;
wherein the abnormal state of the vehicle comprises a vehicle damage;
a control unit which is connected to the battery module to monitor a charged/discharged status of the plurality of battery cells of the battery module and controls the switches to balance the plurality of battery cells; and
a plurality of filters connected between a corresponding battery cell of the plurality of battery cells and the control unit to remove a noise of a signal from the corresponding battery cell,
wherein each of the plurality of filters includes a resistor and a capacitor in series,
wherein when the control unit receives a vehicle abnormal state signal from the detecting unit, the control unit controls the switches to be turned on/off at predetermined different duty ratios according to a temperature of the discharging elements to discharge the corresponding battery cells, and
wherein the control unit controls the switches at a duty ratio in which an on:off ratio is 3:7 to minimize a rapid temperature rise of at least one of the plurality of battery cells.

2. The battery discharging apparatus of claim 1, wherein a plurality of battery modules is provided and the control unit independently controls the battery modules at the predetermined duty ratio to discharge the plurality of battery cells.

3. The battery discharging apparatus of claim 1, wherein a plurality of battery modules is provided and the control unit simultaneously controls adjacent battery modules at the predetermined duty ratio to discharge the plurality of battery cells.

4. The battery discharging apparatus of claim 1, wherein the control unit subsequently performs cell sensing, cell diagnosing, and cell balancing control including turning on/off the switch during a predetermined interval, and the on and off interval of the switch has a duty ratio of 3:7.

5. A battery cell discharging method of a vehicle battery management system including battery modules configured by a plurality of battery cells and a plurality of filters connected between a corresponding battery cell of the plurality of battery cells and a control unit to remove a noise of a signal from the corresponding battery cell, wherein each of the plurality of filters includes a resistor and a capacitor in series, the method comprising:
detecting, by a sensor, the vehicle crash or damage to generate a vehicle abnormal state signal;
receiving, by the control unit, the vehicle abnormal state signal;
measuring a temperature of balancing resistors corresponding to the respective battery cells; and
discharging a battery cell by controlling switches to be turned on/off at a predetermined duty ratios according to the temperature of the balancing resistors to discharge the battery cells, wherein an on:off ratio of the duty ratio of the switches is 3:7 to minimize a rapid temperature rise of at least one of the battery cell.

6. The battery discharging method of claim 5, wherein the discharging of a battery cell includes subsequently performing cell sensing, cell diagnosing, and cell balancing control including turning on/off the switch during a predetermined interval, and the on and off interval of the switch has a duty ratio of 3:7.

7. The battery discharging method of claim 5, wherein in the discharging of a battery cell, the battery modules are independently controlled to be on/off at the predetermined duty ratio to discharge the battery cell.

8. The battery discharging method of claim 5, wherein in the discharging of a battery cell, a group of adjacent battery modules is controlled to be on/off at the predetermined duty ratio to discharge the battery cell.

* * * * *